United States Patent [19]
Mavrovic

[11] 3,804,555
[45] Apr. 16, 1974

[54] PULSATION DAMPENER FOR HIGH PRESSURE CARBAMATE RECYCLE PUMP AND METHOD OF OPERATION THEREOF

[76] Inventor: Ivo Mavrovic, 530 E. 72nd St., New York, N.Y. 10021

[22] Filed: June 5, 1972

[21] Appl. No.: 259,619

[52] U.S. Cl. .................. 417/53, 138/26, 417/540
[51] Int. Cl. ............................................. F04b 11/00
[58] Field of Search ............ 417/540, 542, 543, 53; 138/26, 30; 137/207, 207.5, 209

[56] References Cited
UNITED STATES PATENTS
3,556,692  1/1971  Pigott et al. ..................... 417/540
2,141,703  12/1938  Bays ................................... 417/540

FOREIGN PATENTS OR APPLICATIONS
470,698  1/1929  Germany ........................... 417/540

Primary Examiner—Carlton R. Croyle
Assistant Examiner—Richard Sher
Attorney, Agent, or Firm—Flynn & Frishauf

[57] ABSTRACT

Mechanical failures of pumps adapted to transfer ammoniacal aqueous solutions of ammonium carbamate are avoided or minimized by including a pulsation dampener in the suction line to such pumps. A system for transferring such solutions from lower to higher pressures, and a method for operating the system, are provided.

14 Claims, 1 Drawing Figure

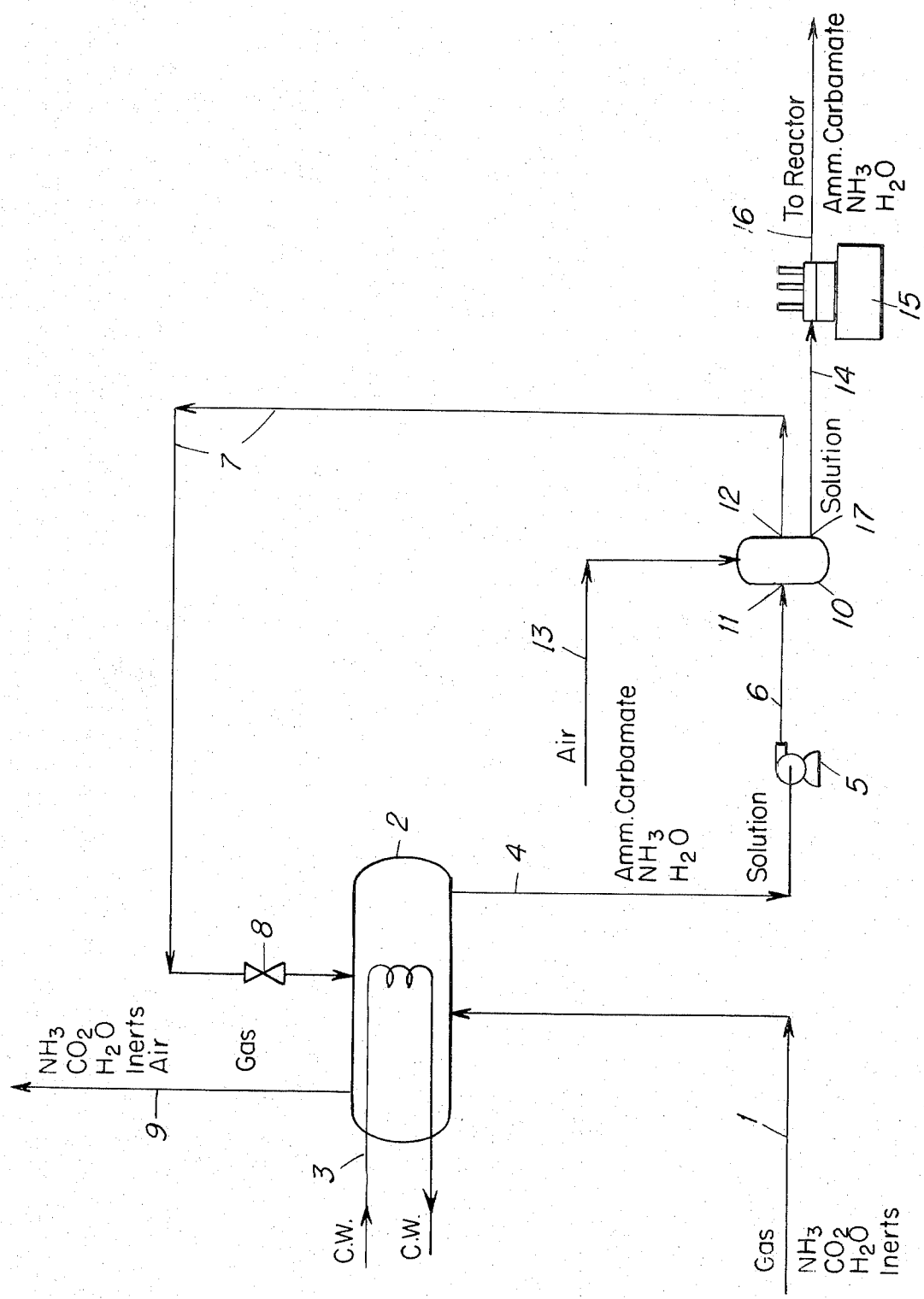

PULSATION DAMPENER FOR HIGH PRESSURE CARBAMATE RECYCLE PUMP AND METHOD OF OPERATION THEREOF

This invention relates to a pulsation dampener for a relatively high pressure carbamate pump and to an improved method of pumping an ammoniacal aqueous solution of ammonium carbamate.

Urea is commercially produced from $NH_3$ and $CO_2$ in a urea synthesis reactor at elevated pressure and temperature. $NH_3$ and $CO_2$ charged to a urea synthesis reactor first combine to produce ammonium carbamate, and ammonium carbamate is dehydrated in the reactor to urea. The first reaction is instantaneous and practically complete; the second one is relatively slower and incomplete, so that the reactor effluent at completion of reaction contains urea, water and unconverted ammonium carbamate. For the purpose of separating the urea product from the unconverted carbamate, the reactor effluent is let down in pressure and indirectly heated with steam to decompose the unconverted carbamate to $NH_3$ and $CO_2$ gas. The $NH_3$ and $CO_2$ gases are separated from the residual aqueous urea solution, cooled in a suitable carbamate condenser in the presence of excess ammonia, reacted to form ammonium carbamate and dissolved in an aqueous solution of ammonia. The resulting ammoniacal aqueous solution of ammonium carbamate is elevated in pressure by means of a high pressure carbamate recycle pump, either of the plunger, centrifugal or turbine type, and is recycled to the urea synthesis reactor for recovery.

It is customary to provide the suction side of the carbamate recycle pump injecting the recovered solution into the reactor with a solution booster pump, located in series between the carbamate condenser and the carbamate recycle pump. Such a booster pump serves the purpose of elevating in pressure the carbamate recycle solution formed in the carbamate condenser by 10–50 psi above the operating pressure of the carbamate condenser, thus preventing the carbamate recycle pump from cavitating due to insufficiently high liquid pressure at the suction of the pump.

A common problem encountered in commercial installations for the production of urea on the basis of the method described above consists of frequent plant shut-downs due to failures of the high pressure carbamate recycle pump and consequent adverse effect on the economics and profitability of the plant. Such pump failures are usually due to cracking of the suction and discharge pump manifolds, cracking of the stuffing boxes sealing the high pressure plungers, and corrosion and pitting of the metal parts of the pump in direct contact with the carbamate recycle solution.

It has been found that by installing a pulsation dampener, directly filled with air, on the suction piping of the high pressure carbamate recycle pump and between the pump itself and the solution booster pump mentioned above, the above-described pump failures are practically eliminated.

In accordance with the present invention, a pulsation dampener is installed on the suction side of the carbamate recycle pump, and air or other inert gas is supplied to said pulsation dampener for the purpose of increasing the mechanical reliability of the pump. The life of the various components of the pump and the life of the pump parts in direct contact with the process fluid is extended. Mechanical failures of the metal due to stress and due to corrosion are eliminated.

In a preferred embodiment of this invention, referring to the schematic flow sheet in the attached drawing, $NH_3$—$CO_2$ gas and water vapor with some inerts at about 300 psig pressure and about 300°F. in line 1 produced in a carbamate decomposer (not shown) are fed to partial condenser 2 operating at about 300 psig and provided with coil 3 for indirect cooling with water. The fluid in partial condenser 2 is cooled to about 212°F. and the carbamate solution thus formed is recirculated through line 4, elevated in pressure to about 350 psig by means of solution booster pump 5 (e.g., a relatively low head centrifugal pump), and returned through lines 6 and 7 back to carbamate condenser 2. Valve 8 on return line 7 serves the purpose of throttling the flow of liquid through line 7 and thus of maintaining a constant over pressure of about 50 psi at the discharge of solution booster pump 5 in relation to partial carbamate condenser 2.

Uncondensed excess ammonia, containing minor amounts of $CO_2$, water vapor, inerts and air, is discharged from partial condenser 2 via overhead line 9 for further processing in another unit not shown on the drawing.

Vertical cylindrical suction pulsation dampener 10 is a closed vessel or tank such as about 1–2 feet in diameter and about 5 feet high, is interposed between lines 6 and 7 so that connection 11 for inlet piping 6 and connection 12 for outlet piping 7 are located at about the mid height thereof, and the solution discharged from solution booster pump 5 flows freely therethrough. Air at about 350 psig (a pressure substantially equal to the pressure in line 6), is supplied to the top section of pulsation dampener 10 through line 13, in such an amount as to totally displace the liquid phase from an upper section of pulsation dampener 10 down to connections 11 and 12. A continuous supply of air in slight excess above the amount required to attain the result of displacing the liquid phase as described above, is maintained through line 13, so that this slight excess of air is readily discharged through connection 12 and line 7 to partial condenser 2, and so as to prevent air from displacing the liquid phase in pulsation dampener 10 much below connection 12 of line 7. As shown, air is in direct contact with the solution in tank 10.

The liquid level in partial condenser 2 is maintained constant by withdrawing carbamate solution from pulsation dampener 10 through line 14, elevating the solution in pressure to about 3,300 psig by means of carbamate recycle high pressure plunger pump 15, preferably located at the same elevation as pulsation dampener 10, and through discharge line 16 delivered to a urea synthesis reactor (not shown). Pump 15 will have the capacity to operate at pressures ranging from about 1,500 to about 6,000 psig.

Line 14 is connected with pulsation dampener 10 at point 17 located below connection 12 in such a manner as to prevent air from entering line 14 and from causing cavitation in high pressure carbamate recycle pump 15.

An additional stream (not shown) can be optionally added to partial condenser 2, such stream containing a solution of one or more of the following materials: $H_2O$, $NH_3$, ammonium carbonate or carbamate, urea, biuret, etc., for the purpose of improving the absorption of the gaseous stream fed to partial condenser 2 through line 1. In this case, the carbamate recycle solution in lines 6, 7, 14 and 16 will contain urea and biuret in addition to the materials shown on the drawing.

In another embodiment of this invention, solution booster pump 5 can be omitted. In this case it is preferred to elevate partial condenser 2 well above pulsation dampener 10 and carbamate recycle pump 15, in order to attain a higher pressure in pulsation dampener 10 than in partial condenser 2.

It is to be understood that any gas inert in the system described can be employed in dampener 10, in place of air. For example, $NH_3$, $N_2$, $O_2$, etc., and mixtures can be employed to decrease or eliminate substantially pulsations in the system. Air, $O_2$ and other $O_2$-containing mixtures which are inert in the system described, also serve to passivate metal parts of the equipment, particularly the carbamate recycle pump, because oxygen is slightly soluble in carbamate solutions.

As a further alternative, circulation line 7 can be omitted. In this circumstance, a liquid level detector (not shown) is mounted on vessel 10. The quantity of inert gas supplied through line 13 to vessel 10 is carefully controlled to maintain the liquid level of solution within the vessel above line 14, in order to prevent cavitation of pump 15.

I claim:

1. A pulsation dampening pumping system for pumping a liquid, comprising:
   a pulsation dampening vessel having an inlet conduit for charging the liquid thereto, a pump suction line connected thereto, and a liquid draw-off line connected thereto at a point above said pump suction line connection,
   a pump adapted to raise the pressure of the liquid to a higher pressure value, having said suction line connected thereto, and having a discharge line,
   and means for continuously supplying a gas to an upper portion of said vessel at least in an amount sufficient to maintain the liquid in said vessel at about the height of the connection of said draw-off line to said vessel, said draw-off line drawing off a portion of said liquid and the excess of said gas.

2. A system according to claim 1 wherein said gas is air.

3. A method for transferring a liquid from a lower pressure to a higher pressure by utilizing a pump having a suction inlet conduit and a discharge conduit therefor, comprising the steps of
   introducing the liquid into an enclosed vessel, the suction inlet conduit of said pump being connected to the vessel and the vessel having a draw-off line connected thereto at a point above the pump suction conduit connection;
   partially filling said closed vessel with said liquid;
   continuously introducing a gas into the remaining space within the vessel at least in an amount sufficient to maintain the liquid level of the liquid therein at about the height of the connection of the draw-off line to the vessel;
   conducting said liquid to the suction inlet of the pump and through the pump; and drawing off a portion of said liquid and the excess of said gas through said draw-off line;
   the pressure pulses due to pump operation being balanced by elastic compression and expansion of said gas in contact with the liquid in the vessel.

4. The method of claim 3, wherein said gas is air.

5. A system for transferring an ammoniacal aqueous solution of ammonium carbamate from a carbamate condenser to a urea synthesis reactor, wherein the pressure of said solution is increased, comprising
   a pulsation dampening vessel having an inlet conduit for charging the solution thereto, a pump suction line connected thereto, and a solution circulation line connected thereto at a point above said pump suction line connection,
   a pump adapted to raise the pressure of the solution to a higher pressure value, having said suction line connected thereto, and having a discharge line,
   and means for continuously supplying a gas to an upper portion of said vessel at least in an amount sufficient to maintain the solution in said vessel at about the height of the connection of said circulation line to said vessel, said circulation line drawing off a portion of said solution and the excess of said gas.

6. A system according to claim 5, wherein said vessel has an unobstructed internal space, the gas charge to said vessel being in direct contact with said solution therein.

7. A system according to claim 5, wherein said pump is a plunger pump having a capacity of operating at pressures of from about 1,500 to about 6,000 psig.

8. A system according to claim 5, wherein said gas is air.

9. A system according to claim 5, wherein said gas contains oxygen.

10. The system of claim 5, wherein the gas is a gas inert in the system.

11. In the method for transferring an ammoniacal aqueous solution of ammonium carbamate from a lower pressure to a higher pressure by utilizing a pump having a suction inlet conduit and a discharge conduit therefor, comprising the steps of
    introducing the solution into an enclosed vessel, the suction inlet conduit of said pump being connected to the vessel and the vessel having a circulation line connected thereto at a point above the pump suction conduit connection;
    partially filling said closed vessel with said solution;
    continuously introducing a gas into the remaining space within the vessel at least in an amount sufficient to maintain the liquid level of the solution therein at about the height of the connection of said circulation line to the vessel;
    conducting said solution to the suction inlet of the pump and through the pump; and
    drawing off a portion of said solution and the excess of said gas through said circulation line;
    the pressure pulses due to pump operation being balanced by elastic compression and expansion of said gas in contact with the solution in the vessel.

12. The method of claim 11, wherein the gas is in direct contact with said solution in said vessel.

13. The method of claim 11, wherein the gas contains oxygen.

14. The method of claim 11, wherein the gas is a gas inert to said solution.

* * * * *